United States Patent
Crawford

[15] 3,684,028
[45] Aug. 15, 1972

[54] GRASS EDGER WITH ONE-PIECE CUTTER BAR COLLAR

[72] Inventor: Howard H. Crawford, 1100 Zuni, El Paso, Tex. 79905

[22] Filed: Nov. 17, 1970

[21] Appl. No.: 90,329

Related U.S. Application Data

[63] Continuation-in-part of Ser. No. 33,591, May 1, 1970.

[52] U.S. Cl. ....................172/15, 172/17, 172/540, 56/256, 83/469, 83/663, 287/119, 83/698
[51] Int. Cl. ..............................................A01b 45/00
[58] Field of Search..........................172/13–18, 21, 172/45; 83/660, 698, 469, 663; 30/299; 56/256, 284–295, 400, 12.7; 241/194

[56] References Cited

UNITED STATES PATENTS

| | | |
|---|---|---|
| 416,982 | 12/1889 | Young........................172/545 |
| 3,018,602 | 1/1962 | Diesterweg..................56/295 |
| 2,538,230 | 1/1951 | Boggs..........................172/16 |
| 2,663,137 | 12/1953 | Asbury........................56/295 |
| 2,791,077 | 5/1967 | Lyle............................56/256 |
| 2,888,993 | 6/1959 | Dunning......................172/15 |

*Primary Examiner*—Robert E. Pulfrey
*Assistant Examiner*—C. W. Hanor
*Attorney*—Clarence A. O'Brien and Harvey B. Jacobson

[57] ABSTRACT

A grass cutting head having a driving shaft mounting axially spaced flange and plate components. Angularly spaced collars re rotatably supported between the flange and plate components. Each collar is fabricated from a single unit having a slotted head portion and an integrally connected shank portion which is received in a corresponding aperture in the flange component. A radially extending nail is received in the slotted portion of each collar. The nail serves as a cutting bar and is maintained in the slotted portion by the plate component which is removably positioned against the slotted portion of the collar. The nails may be replaced by moving the plate component away from the slotted portion of the collar.

11 Claims, 10 Drawing Figures

PATENTED AUG 15 1972

Howard H. Crawford
INVENTOR.

BY Clarence A. O'Brien
and Harvey B. Jacobson
Attorneys

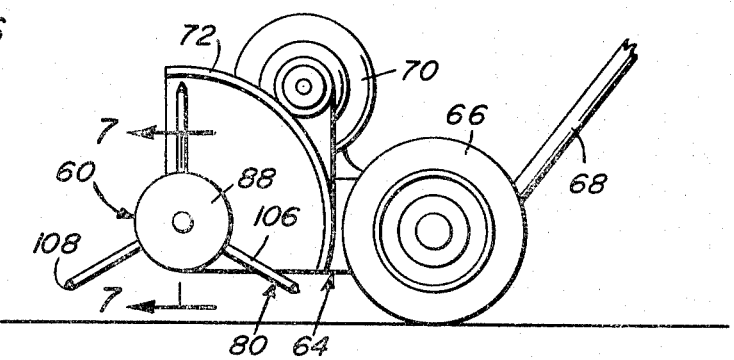
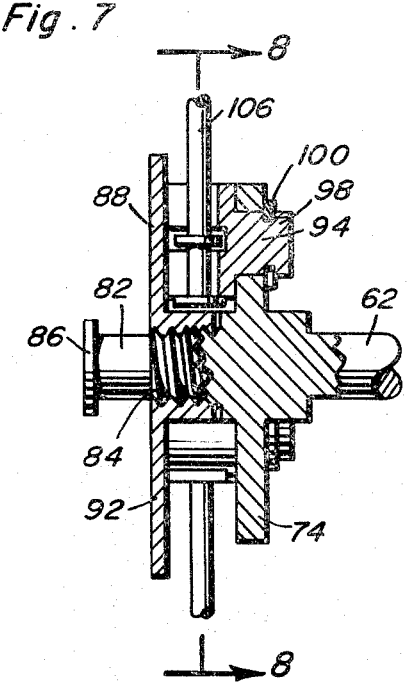
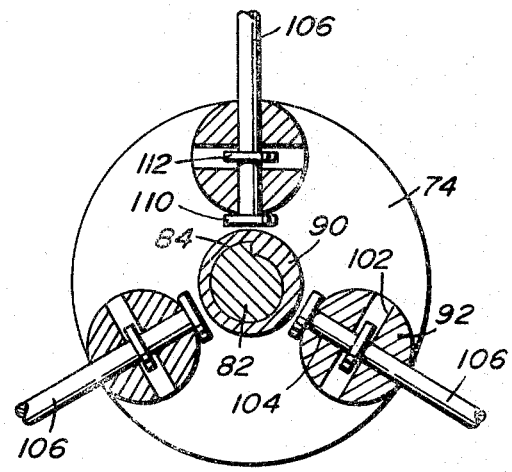
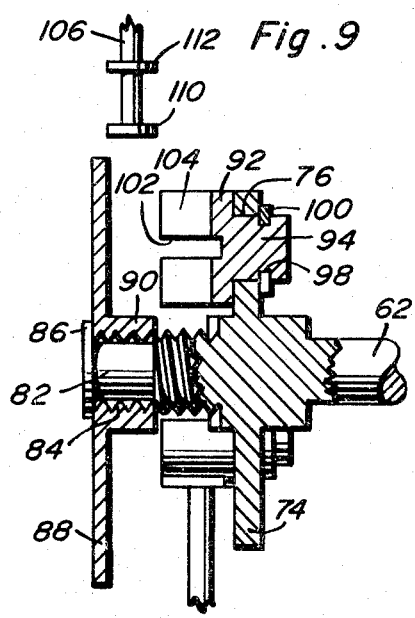
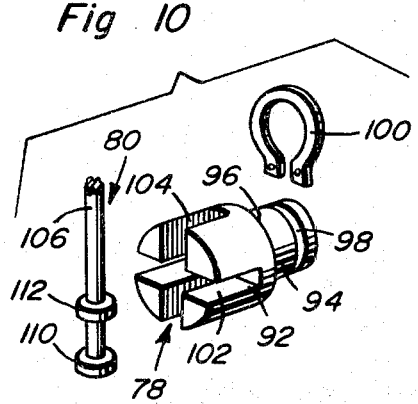
Howard H. Crawford

GRASS EDGER WITH ONE-PIECE CUTTER BAR COLLAR

RELATED APPLICATION CROSS REFERENCE

The present application is a continuation-in-part of my previous application, Ser. No. 33,591, filed May 1, 1970.

FIELD OF THE INVENTION

The present invention relates to cutting heads and more particularly to a cutting bar assembly for lawn edgers.

SUMMARY OF THE PRIOR ART

As previously explained in my co-pending application, lawn edgers are relatively complex in structure which makes them comparatively expensive. Also, the prior art edgers have included cutting members that are machined so as to include a cutting edge. During continued use, these edges dull and require costly replacement or inconvenient sharpening.

My previously referenced co-pending application presents a solution to the cost and inconvenience factors that are associated with prior art devices. Briefly, the inventive device disclosed in the copending application includes two coaxial members mounted on a rotating shaft with slotted collar means clamped between the two members. The headed portion of a common nail is inserted in the collar by separating the coaxially mounted members. Then, after the nail is received in a corresponding collar, a shaft mounted spring forces the coaxially mounted members together thereby clamping the nail in the collar. As will be appreciated, utilization of common nails instead of machined cutting members substantially reduces the price and maintenance of the cutting bars.

In my previous application, the collar means comprise two sections. Although the previously disclosed unit operates satisfactorily, it has been found that by substituting a single unit collar in lieu of the two section collar, a stronger edger results and additionally, fabrication costs are reduced.

SUMMARY OF THE INVENTION

The present invention is similar in structure and purpose to the edger disclosed in the co-pending application. However, the collar means of the previously disclosed device has been modified so that it is a single unitary piece as opposed to a two part assembly. The single piece collar means employed in the present invention includes an enlarged headed portion having a crossed slot formed therein for receiving the head of a nail, the nail serving as a cutting bar. A shank portion of the collar means extends from the enlarged headed portion and is received within a corresponding aperture in an annular flange component. In order to retain the shank portion in the annular flange component, a C-shaped spring clip engages an annular groove formed in the shank portion. As previously mentioned, two main advantages are obtained by using collar means constructed from a single piece as opposed to being constructed from two pieces. The advantages are the realization of a stronger edger head which may be fabricated more inexpensively.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 6 is a side elevational view similar to FIG. 1 but illustrating another embodiment of the invention;

FIG. 7 is a vertical sectional view, on an enlarged scale, taken substantially upon a plane passing along section line 7—7 of FIG. 6 illustrating the structural details of this embodiment of the invention;

FIG. 8 is a vertical sectional view taken substantially upon a plane passing along section line 8—8 of FIG. 7 illustrating further structural details of this embodiment of the invention;

FIG. 9 is a sectional view similar to FIG. 7 but illustrating the plate and flange components separated to enable assembly and disassembly of the cutting bars; and FIG. 10 is an exploded group perspective view illustrating one of the cutter bar mounting collars.

Figure 1:
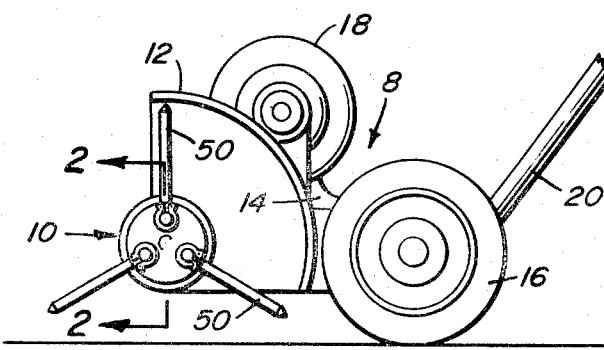
FIG. 1 is a side elevational view illustrating the disposition of the present cutting bar head on a powered lawn edger tool.

Referring to the Figures and more particularly FIG. 1, a powered lawn edger tool is seen to be equipped with a rotary head 10, the head being connected to a powered carrier generally indicated by reference numeral 8. This carrier is of the type currently available on the market. The conventional parts of the carrier include a cutting head shield 12 mounted to a frame 14 equipped with rear wheels 16. A motor 18, usually of the electric type, is mounted to frame 14. Of course, the motor 18 may also be an internal combustion engine with an appropriate transmission. Handle bar 20 is secured to the frame and permits the lawn edger to be steered along the ground.

Figure 2:
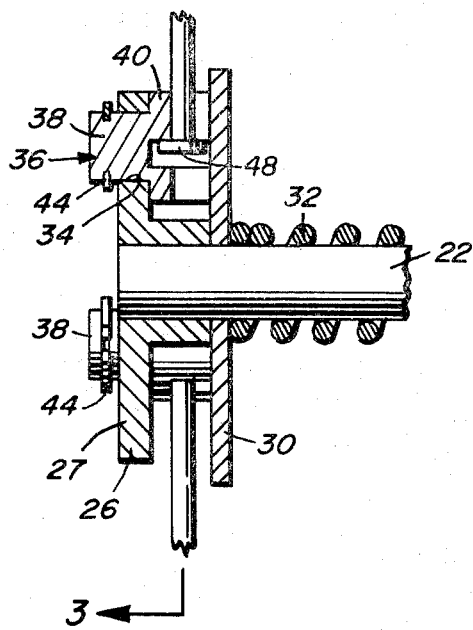
FIG. 2 is an enlarged sectional view taken along a plane passing through section line 2—2 of FIG. 1 illustrating the component parts of the present invention.
Figure 3:
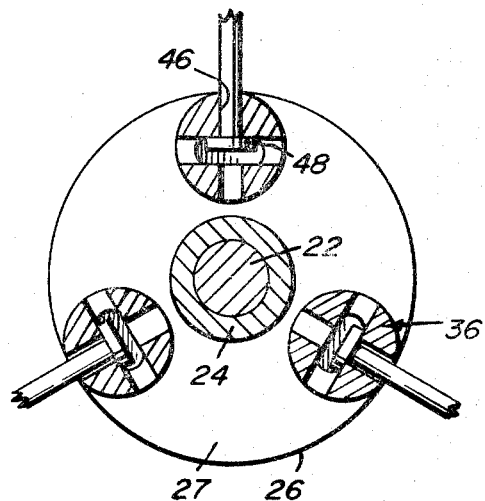
FIG. 3 is a sectional view taken along a plane passing through section line 3—3 of FIG. 2 and shows the disposition of nail cutter bars in their respective collars.
Figure 4:
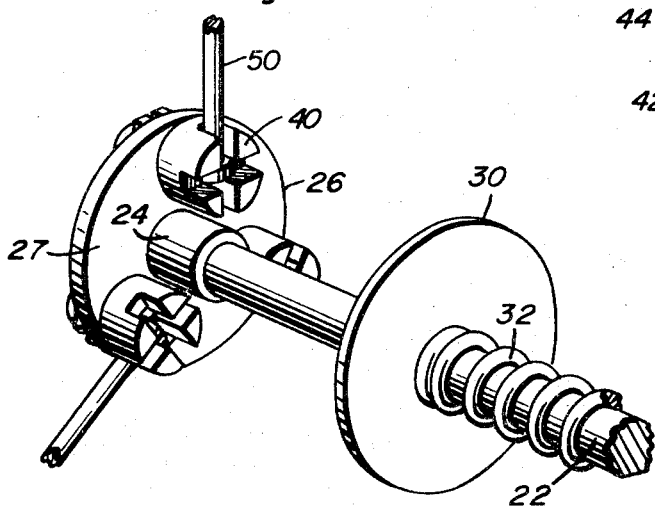
FIG. 4 is a perspective view illustrating the disposition of the cutter bars in their collars, the view being taken when a component plate is moved against a biasing spring to allow removal of the cutter bars.

Considering FIGS. 2–4, a drive shaft 22 axially mounts the components of the present invention. The shaft is usually coupled to the electric motor 18 from which it derives power to rotate.

A disc shaped flange component 26 has an integrally attached hub or boss 24 into which the outward end of shaft 22 is press-fitted. Thus, as shaft 22 rotates, the flange component 26 rotates with it.

A disc-like or annular plate component 30 is slidably and rotatably mounted in axially spaced relation to the flange 26 and is clamped against the inward end of the hub 24 by an axially mounted elongated coil spring 32.

The right end of spring 32 is secured in place by a mechanical stop (not shown) such as a bushing secured in an adjusted position on shaft 22 by a setscrew.

Figure 5:
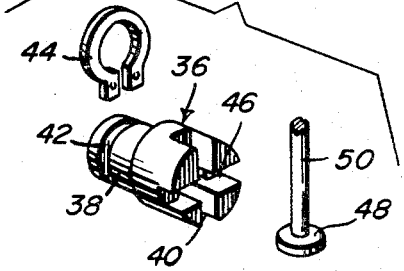
FIG. 5 is an exploded view illustrating the collar employed in the present invention along with a C-shaped spring clamp which retains the collar in the cutter bar head.

The flange 26 component includes three apertures 34 located at equal radial distances from the shaft 22, the apertures also being angularly displaced by 120 degrees from one another. The apertures permit the insertion and retention of collar means 36 clearly indicated in FIG. 5. More particularly, each collar means 36 includes a cylindrical shank portion 38 that extends to an enlarged cylindrical headed portion 40. The shank portion 38 includes an annular groove 42 formed therein which appears on the outward side of the flange component. A C-shaped spring clip 44 is forced into engagement with the groove 42. Since the outer diameter of the spring clip 44 is greater than the diameter of aperture 34, the collar means 36 is retained in the aperture 34. A crossed slot 46 is formed inwardly from the headed end 40. The head 48 of a nail 50 is received in the slot. As indicated in the remaining Figures, the body of the nail 50 extends radially outwardly from the periphery of the flange component 26.

When assembling the cutter head, the flange component 26 is secured to the shaft 22. Then, all the collar means 36 are inserted in their respective apertures 34. By installing the C-shaped spring clips 44 on the collar means, the latter are rotatably secured to the flange component 26. Next, nails 50 are positioned in the slotted portions 46 of respective collar means. Thereafter, plate component 30 is concentrically mounted on the shaft 22 and is positioned against the collar means 36. The spring 32 is installed on the shaft 22 so as to normally bias the plate component 30 against the collar means 36 thereby securing retention of the nails in their respective collars.

Inasmuch as the nails employed are of a common variety, and do not include specially machined cutting edges, they are expected to serve for a greater length of time than currently available cutting bars with machined edges. However, when replacement of a nail becomes necessary, all that is required is the displacement of the plate component 30 against the biasing spring 22, as indicated in FIG. 4. This displacement makes the nails accessible for removal. After new nails are installed, the plate component 30 is again positioned in clamping relationship against the collar means 36. By so doing, the cutting head 10 is ready to be installed on the remaining carrier 8 for continued use.

Referring now specifically to FIGS. 6–10, the cutting head for the lawn or grass edger in this embodiment of the invention is generally designated by the numeral 60 and is carried by a driven shaft 62 supported on a frame or supporting structure of a grass or lawn edger 64 which includes a supporting wheel or wheels 66, a manipulating handle 68, a source of power such as an electric motor, internal combustion engine or the like 70 which drives the shaft 62 and a shield 72 for the cutter head 60. The structure of the lawn edger is conventional with the present invention being restricted to the cutter head 60.

Attached to or integral with the shaft 62 is a circular mounting flange 74 that is provided with a plurality of circumferentially spaced apertures 76 therein. As illustrated, three apertures are provided and they are equally spaced around the axis of the shaft 62. Positioned in each of the apertures 76 is a mounting collar generally designated by the numeral 78 which receives a cutting bar or element generally designated by the numeral 80. The outer end of the shaft 62 is provided with an axial extension 82 which has an externally threaded portion 84 where it joins with the center of the circular flange 74 and the outer end of the axial extension 82 is provided with a peripheral retaining flange 86 which is permanently formed on the end of the extension 82 or the flange 86 may be removable but would normally be securely locked in position since there would be no reason to disassemble the cutter head during normal operating conditions although it may be necessary in some instances to replace a component.

Mounted on the extension 82 is a circular plate 88 having a central internally threaded hub 90 in screw threaded engagement with the externally threaded portion 84 of the extension 82 with it being pointed out that when the plate 88 is rotated in a manner to move it toward the flange 86, the plate 88 will abut the flange 86 while still in screw threaded engagement with the threaded portion 84 of the shaft 62. Thus, by relative rotation of the plate 88 with respect to the shaft 62 and the flange 74, the plate 88 may be moved toward and away from the flange 74.

Each of the mounting collars 78 includes a generally cylindrical body 92 having a cylindrical axial projection or extension 94 thereon which is of less diameter than the body 92 thus defining a shoulder 96 which abuts one surface of the flange 74 when the extension 94 is inserted through an aperture 76 in the flange 74. The extension 94 is provided with a peripheral groove 98 therein which releasably receives a C-shaped spring ring or snap ring 100 that has resilient engagement with the groove 98 and which has an external dimension greater than the dimension of the aperture 76 in the flange 74 so that the spring ring 100 will retain the mounting collar 78 rotatably on the flange 74 with one surface of the flange 74 being engaged by the shoulder 96 and the other surface of the flange 74 being engaged by the spring ring 100.

the cylindrical body 92 is provided with intersecting slots 102 and 104 which extend perpendicularly to each other and which intersect at the center of the cylindrical body. The slots extend to the end of the cylindrical body and intersect the end surface of the cylindrical body thus providing an entrance way for the cutter bar or cutting elements.

As illustrated, the cutter bar or cutting element 80 is in the form of an elongated rod-like member having a shank 106 and having a pointed end 108 and a head 110 at the other end thereof and may be in the form of a conventional common wire nail or as illustrated, a second flange 112 is provided in spaced relation to the head 110 which represents a conventional duplex nail that is commercially available. Any suitable type of headed nail, screw, rivet or other similar headed rod-like member may be employed as a cutting bar so long as the head 112 is of sufficient dimension to be slidably received within the slot 102 and the shank 106 is of a diameter to be received within the slot 104. It is noted that the slot 102 is not as wide as the slot 104 so that the shank 106 of the cutting element 80 can be positioned only in the slot 104 although it may be positioned in the slot 104 so that it will project from either of two diametrically opposed surfaces thereof. This structure enables some degree of relative movement between the cutting element and the mounting collar 78 but the shank 106 of the cutting element should be somewhat close to the dimensions of the slot 104 to retain the cutting element substantially in radial relation to the mounting collar 78 so that as the shaft 62 is rotated, the cutting element 80 will assume substantially a radial position in relation to the shaft 62.

In operation, the threads 84 and the threads on the hub 90 are arranged so that the shaft 62 during its normal rotation will tighten the plate 88 into engagement with the flat outer surface of the body 92 thus retaining the cutting elements within the slots on the mounting collar. By holding the shaft 62 from rotation and rotating the plate 88 in the opposite direction, the plate 88 may be moved away from the collars 78 to the position illustrated in FIG. 9 in which condition the cutting elements 80 may be easily removed and replaced thus enabling the cutting elements to be easily replaced in the event of damage, bending or the like and to enable cutting elements of different lengths to be provided if desired within the limits of the shield 72. If necessary, the mounting collars may also be easily replaced by removing the spring 100 with a suitable tool and then removing the collar or collars and replacing them if necessary or desired. As illustrated, the head 112 being received in slot 102 and head 110 engaged with the outer periphery of the collar body 92 provides a safety factor and long wearing capabilities as two heads serve to retain the nails 80.

Also, the surface of the slot 102 where it intersects the slot 104 may be recessed to provide a centered position for the head 112 of the nail or cutting element when both nail heads engage the collar so that the shank 106 will normally be spaced away from the plate 88 as well as the flange 74 during operation thereby reducing any tendency of the shank 106 to come into contact with the periphery of the plate 88 which has a diameter only slightly greater than the diameter of the mounting collars and flange 74 with it being noted that the external periphery of the body 92 is substantially coincident with the external periphery of the flange 74. While the flange 74 has been illustrated as being integral with the shaft 62, it may be secured in place thereon by any suitable setscrew, key or may be press-fitted thereon or assembled in any other suitable manner to facilitate assembly of the cutter head with the shaft 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A rotary cutting head for a lawn edger having an output shaft comprising a peripheral flange stationarily mounted on the shaft, a plate carried by said shaft and movable toward and away from the flange, a plurality of radially extending cutting elements having an inner end disposed between the flange and the plate, and mounting means for the cutting elements carried by said shaft, said mounting means extending toward the plate and engaged by the plate for retaining the cutting elements on the mounting means, each of said cutting elements having a headed inner end, said mounting means including slot means open toward the plate for receiving the headed inner end of the cutting elements whereby the plate when engaged with the mounting means will retain the cutting elements on the mounting means, said mounting means being in the form of a collar having a substantially cylindrical body with an axial extension of reduced diameter on one end thereof, said flange including a plurality of equally spaced circumferentially arranged apertures therein rotatably receiving the axial extensions, each axial extension having a groove therein, and a spring ring engaged with the groove for detachably mounting the collar on the flange, said body and axial extension being of one-piece construction.

2. The structure as defined in claim 1 wherein said body includes intersecting slots defining the slot means therein, said cutting elements being in the form of nails having a headed end with the shank of the nails being received in one slot and the head of the nail being received in an intersecting slot.

3. The structure as defined in claim 1 wherein said mounting means are radially mounted on said flange so that rotation of the flange and shaft will cause the cutting elements to extend radially from the flange and plate.

4. A mounting collar for headed, rod-like cutting bars carried by a rotary cutting head of a lawn edger, said mounting collar comprising a body having axially extending mounting means at one end thereof, the other end of said body having intersecting slots extending longitudinally inwardly from the end of the body, said slots being in substantially perpendicular relation to each other and in intersecting relation to each other whereby one slot receives the radially extending shank of a cutting bar while the other slot receives the headed end thereof, said body being substantially cylindrical, said mounting means being in the form of a cylindrical extension adapted to extend through an aperture in the rotary cutting head, the cylindrical extension being of lesser diameter than the cylindrical body whereby the cylindrical body will engage the mounting flange, the other end of the cylindrical extension having a peripheral groove therein receiving a spring ring to rotatably retain the cylindrical extension in the mounting flange to enable movement of the mounting collar about a longitudinal axis.

5. The mounting collar as defined in claim 4 together with a double headed nail serving as the cutting bar, the inner head on the nail being received in said one slot and the outer head on the nail engaging the peripheral surface of the body.

6. A rotary cutting head comprising a rotary shaft, a first plate mounted on said shaft, a second plate mounted on said shaft, a plurality of radially extending cutting elements each having an inner end disposed between said plates, mounting means for the cutting elements carried by one of said plates and extending toward the other of said plates, said plates being mounted on said shaft for relative movement toward and away from each other, said mounting means including a body rotatably mounted on one of said plates, slot means in said body opening radially thereof and axially thereof toward the other plate whereby the other plate will close the axially opening slot means when in engagement with the body, each cutting element including a cutter member having a headed end, said cutter member extending radially from the radially opening slot means in the body with the headed end engaging the body and preventing radial outward movement of the cutter member.

7. The structure as defined in claim 6 wherein said mounting means for the cutting elements each includes a body having a substantially cylindrical axial extension extending axially away from the other plate, said one plate including a plurality of circumferentially spaced apertures therein rotatably receiving the axial extensions, means axially retaining the axial extensions rotatably within the apertures so that rotation of the shaft will cause the cutting elements to extend radially from the periphery of the plates.

8. The structure as defined in claim 7 wherein one of said plates is fixed rigidly on the shaft, the other of said plates being axially movable on the shaft, and spring means biasing the axially movable plate toward the stationary plate and the mounting means thereon for retaining the cutter members in the slot means thereby enabling replacement of the cutting elements by moving the movable plate axially of the shaft.

9. The structure as defined in claim 7 wherein one of said plates is stationarily mounted on the shaft, the other plate being screw-threadedly engaged with thread means on said shaft whereby relative rotation between the plates will move the movable plate toward and away from the mounting means for removably retaining the headed end of the cutting elements in the slot means in the body.

10. The structure as defined in claim 7 wherein said slot means includes intersecting slots extending longitudinally inwardly from the end of the body remote from the axial extension, one of said slots receiving the cutting member with the other slot receiving the headed end thereof.

11. The structure as defined in claim 10 wherein the slot receiving the headed end is recessed beyond the depth of the slot receiving the cutting member to enable the cutting member to engage the axial inner end of the longitudinal slot with the headed end of the cutting member received in the recess to enable the cutting element to be radially disposed, said axial extension on the body being of reduced cross-sectional dimension to define a shoulder to engage the plate adjacent the aperture therein, said means retaining the axial extension on the plate including a peripheral groove on the axial extension, and a spring ring received in the groove and engaging the plate in opposed relation to the shoulder.

* * * * *